United States Patent [19]

Kojima et al.

[11] Patent Number: 5,412,490
[45] Date of Patent: May 2, 1995

[54] PRINTER PROVIDED WITH AN IMAGE READING UNIT

[75] Inventors: Tetsuji Kojima; Hiromi Miyashita; Shigemi Hagiwara; Naoki Sunaga, all of Tokyo, Japan

[73] Assignee: Oki Electric Industry Co., Ltd., Tokyo, Japan

[21] Appl. No.: 30,156

[22] PCT Filed: Jul. 7, 1992

[86] PCT No.: PCT/JP92/00866
§ 371 Date: Mar. 8, 1993
§ 102(e) Date: Mar. 8, 1993

[87] PCT Pub. No.: WO93/01679
PCT Pub. Date: Jan. 21, 1993

[30] Foreign Application Priority Data

Jul. 9, 1991 [JP] Japan ............................. 3-052909 U
Aug. 14, 1991 [JP] Japan ............................. 3-064456 U

[51] Int. Cl.⁶ .......................................... H04N 1/024
[52] U.S. Cl. ................................. 358/473; 358/498; 355/200
[58] Field of Search .............. 358/473, 498, 474, 496, 358/296, 488, 472; 250/208.1; 355/233, 200, 202, 311, 84

[56] References Cited

U.S. PATENT DOCUMENTS

| 4,266,251 | 5/1981 | Hara et al. | 358/498 |
| 4,754,337 | 6/1988 | Nohtomi et al. | 358/498 |
| 4,962,430 | 10/1990 | Hiroki et al. | 358/401 |
| 4,975,787 | 12/1990 | Ijuin et al. | 358/498 |
| 4,989,237 | 1/1991 | Kotani et al. | 358/473 |
| 5,028,957 | 7/1991 | Sakamoto | 355/202 |
| 5,032,712 | 6/1991 | Ito | 250/208.1 |
| 5,172,243 | 12/1992 | Hayashi et al. | 358/473 |
| 5,225,870 | 7/1993 | Tanimoto et al. | 355/200 |
| 5,276,509 | 1/1994 | Mizuno et al. | 358/474 |
| 5,300,979 | 4/1994 | Tsukakoshi et al. | 355/200 |

Primary Examiner—Edward L. Coles, Sr.
Assistant Examiner—Madeleine Nguyen
Attorney, Agent, or Firm—Spencer, Frank & Schneider

[57] ABSTRACT

A printer 1 provided integrally with an image reading unit 2 which comprises a handy scanner 3 for reading a draft and an automatic draft feeder 4 on which the handy scanner 2 is detachably mounted for automatically conveying the draft wherein a draft jammed in the image reading unit 2 can be easily removed and a scanner hopper 31 is provided over the automatic draft feeder 4 to be turnable about a shaft 32 thereof. A tip end portion 31b of the scanner hopper 31 is urged upward by a spring 36 and a rear end 31a of the scanner hopper 31 is positioned close to the shaft 27 of a separating roller 9. The handy scanner 3 is fixedly positioned to the automatic draft feeder 4 by way of latches 23 and 24.

5 Claims, 6 Drawing Sheets

PRINTER PROVIDED WITH AN IMAGE READING UNIT

TECHNICAL FIELD

The present invention relates to a printer integrally provided with an image reading unit.

BACKGROUND TECHNOLOGY

A handy scanner for manually reading an image information on a draft has conventionally been put to practice, and an image reading unit in which the handy scanner is detachably mounted on an automatic draft feeder has been developed.

Such an image reading unit is described in Japanese Patent Laid-Open Publication No. 61-184044. This invention enables a handy scanner type image reading unit to also serve as a draft conveying type stationary image reading unit besides being a handy scanner type image reading unit by adding a jig capable of conveying drafts to the handy scanner type image reading unit.

The handy scanner type image reading unit as set forth above, however, requires an additional printing device or needs to be connected to a personal computer to perform printing by a printer.

Therefore, a need for an integral type device capable of reading the image information on a draft, printing out the image information on paper, etc. exists. Accordingly, it is the object of the present invention to provide a printer integrally provided with an image reading unit which comprises a handy scanner for reading a draft and an automatic draft feeder on which the handy scanner is detachably mounted for automatically conveying the draft wherein a draft jammed in the image reading unit can be easily removed.

DISCLOSURE OF THE INVENTION

In a printer integrally provided with an image reading unit comprising a handy scanner for reading a draft and an automatic draft feeder which has a paper supply roller and to which the handy scanner is detachably mounted, the printer integrally provided with the image reading unit is characterized in comprising:

- a separating member which is pressed against the paper supply roller and is movable toward and away from the paper supply roller;
- a turning member for carrying the handy scanner thereon, engaging with the separating member and being turned to separate the handy scanner from the automatic draft feeder and the separating member from the paper supply roller when the handy scanner is mounted thereon;
- a biasing member for turning the turning member; and
- a retaining member for retaining the handy scanner at the position where it is mounted on the automatic draft feeder.

When the retaining member for retaining the handy scanner to the automatic draft feeder is disengaged, the turning member is turned by the biasing member and is separated from the automatic draft feeder. Whereby the turning member separates the handy scanner from the automatic draft feeder and the separating member from the paper supply roller. As a result, when a draft is jammed between the handy scanner and the automatic draft feeder, or between the paper supply roller and the separating member, it can be easily removed.

BEST MODE FOR CARRYING OUT THE INVENTION

The present invention will be described in detail with reference to the attached drawings. Elements which are common to the drawings are denoted at the same numerals.

Figure 1:
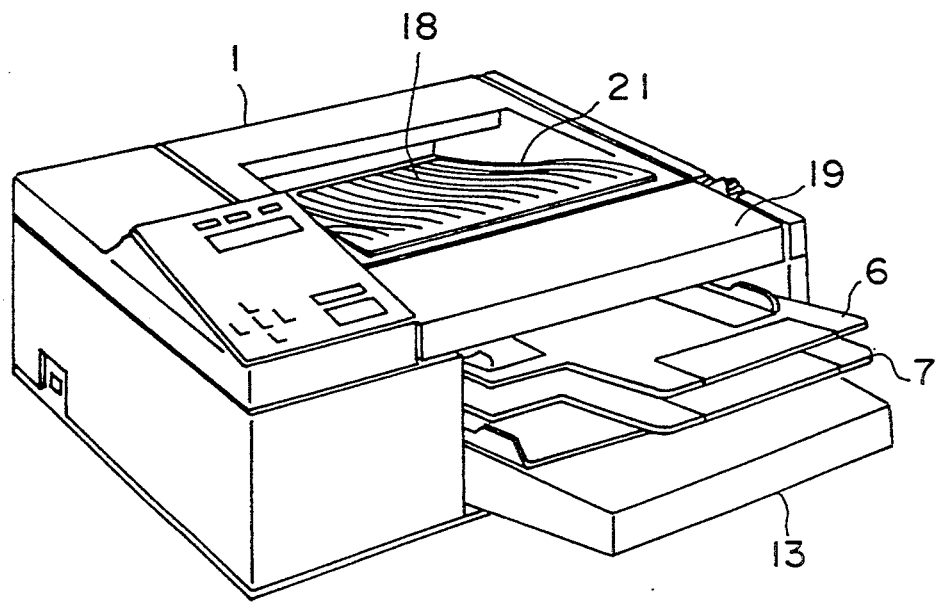
FIG. 1 is a perspective view of a printer provided with an image reading unit according to the present invention.
Figure 2:
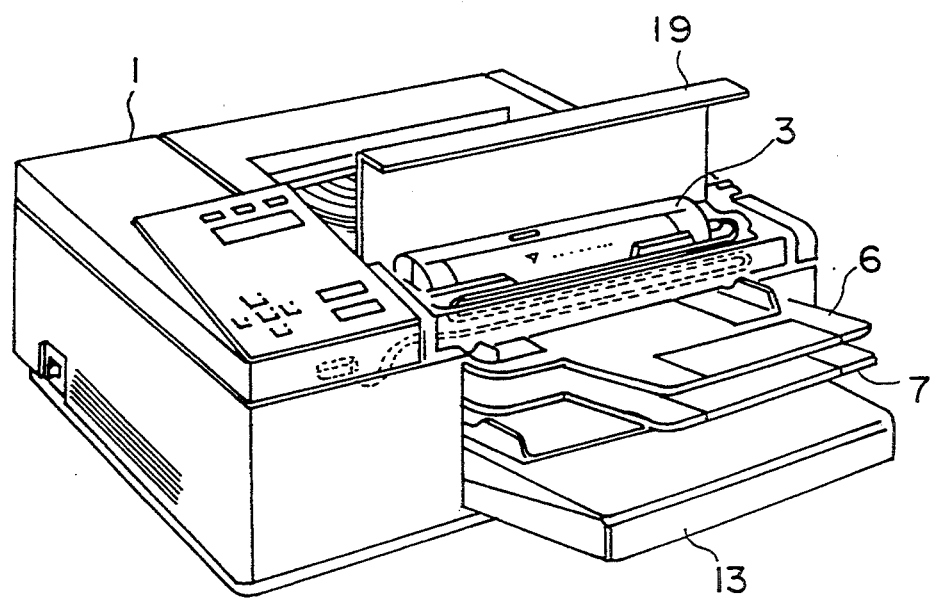
FIG. 2 is a perspective view showing the printer provided with the image reading unit in which a scanner cover is open.
Figure 3:
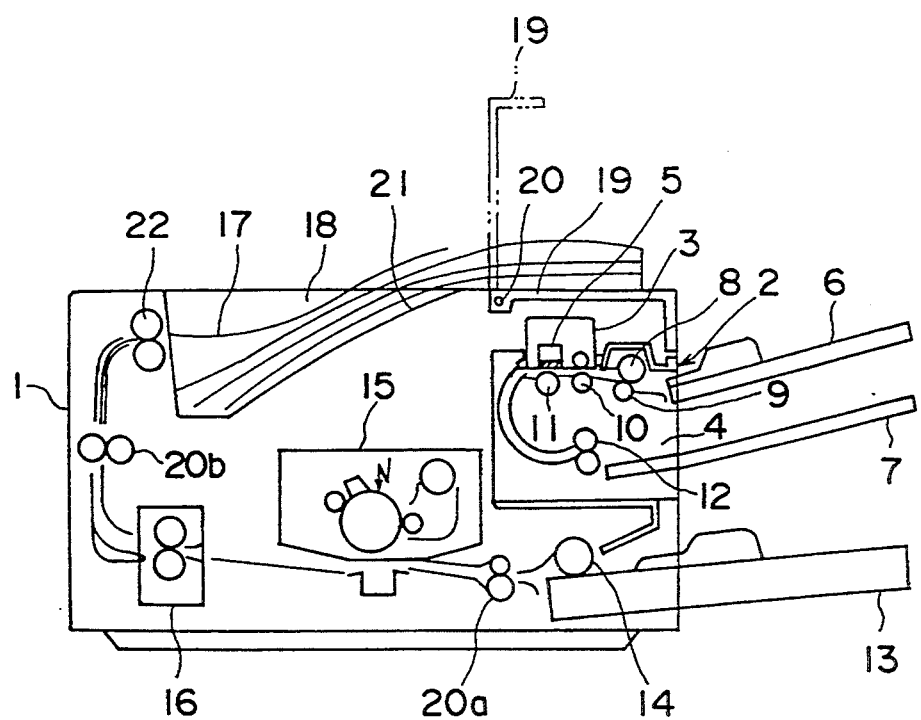
FIG. 3 is a schematic view of the printer provided with the image reading unit for explaining the function thereof.

FIGS. 1 and 2 are perspective views showing a printer provided with an image reading unit according to the present invention. FIG. 3 is a schematic view for explaining the printer provided with the image reading unit.

In FIG. 3, an image reading unit 2 is provided in the printer 1 integrally therewith. The image reading unit 2 is composed of a handy scanner 3 and an automatic draft feeder 4. The handy scanner 3 is provided with a reading sensor unit 5. The handy scanner 3 is easily detachable from the automatic draft feeder 4. The automatic draft feeder 4 comprises a paper supply tray 6, a paper discharge tray 7, a paper supply roller 8, a separating roller 9, conveying rollers 10 and 11 and a discharge roller 12.

A paper cassette 13 for accommodating printing papers therein is provided under the image reading unit 2 and a paper supply roller 14 is fixed above the tip end portion of the image reading unit 2. An image forming portion 15 is provided substantially at the center of the printer 1, in which each printing process such as light exposure, development, transfer, etc. is performed according to an electrophotographic process. A fixing unit 16 is provided on the left of the image forming portion 15. A paper discharging portion 18 for discharging paper 17 after printing is performed thereon is formed in the upper portion of the printer 1. A scanner cover 19 is turnably fixed above the image reading unit 2 about the fulcrum 20 (in the state as illustrated in FIG. 2). The scanner cover 19 covers the upper portion of the image reading unit 2 for preventing obstructive matters, or items, from entering the image reading unit 2 when the scanner cover 19 is shut (in the state as illustrated in FIG. 1). Although the scanner cover 19 is opened when the handy scanner 3 is attached to or detached from the printer 1, obstructive matters are prevented from entering the image reading unit 2 by shutting the scanner cover 19 even when the handy scanner 3 is not attached to the printer 1. The upper surface of the scanner cover 19 is continuous to the stacking surface 21 of the paper discharging portion 18 in the upper portion of the printer 1 so the head portion of the paper 17 can be put on the upper surface of the scanner cover 19 when the paper 17 is discharged into the paper discharging portion 18.

As described above, the closable scanner cover 19 having the stacking surface of the printing paper thereon is provided in the printer and the image reading unit 2 including a detachable handy scanner 3 is provided under the scanner cover 19, so that the printer can be made small in size and light in weight.

An operation of reading an image on a draft will be described with reference to FIG. 3 hereinafter. A draft is put on the paper supply tray 6 and fed sheet by sheet by the paper supply roller 8 and the separating roller 9. The fed draft is conveyed to the reading sensor unit 5 by way of the conveying roller 10, where the image information is read as the draft is pressed against the reading sensor unit 5 by the conveying roller 11. The draft is reversed in its conveying direction after reading and is discharged on the paper discharge tray 7 by the discharge roller 12.

When printing is performed on the paper, the paper supply roller 14 is rotated in response to the instruction from a high-ranking device, not shown, to feed the paper sheet by sheet from the paper cassette 13. The fed paper is conveyed to the image forming portion 15 by a conveying roller 20a, where the image is transferred thereon under the electrophotographic process according to an image information supplied from a high-ranking device, not shown. The image transferred onto the paper is fixed in a fixing unit 16, and thereafter the paper 17 is discharged into the paper discharging portion 18 by a conveying roller 20b and a discharging roller 22.

The image reading unit 2 will be further described in detail.

Figure 4:
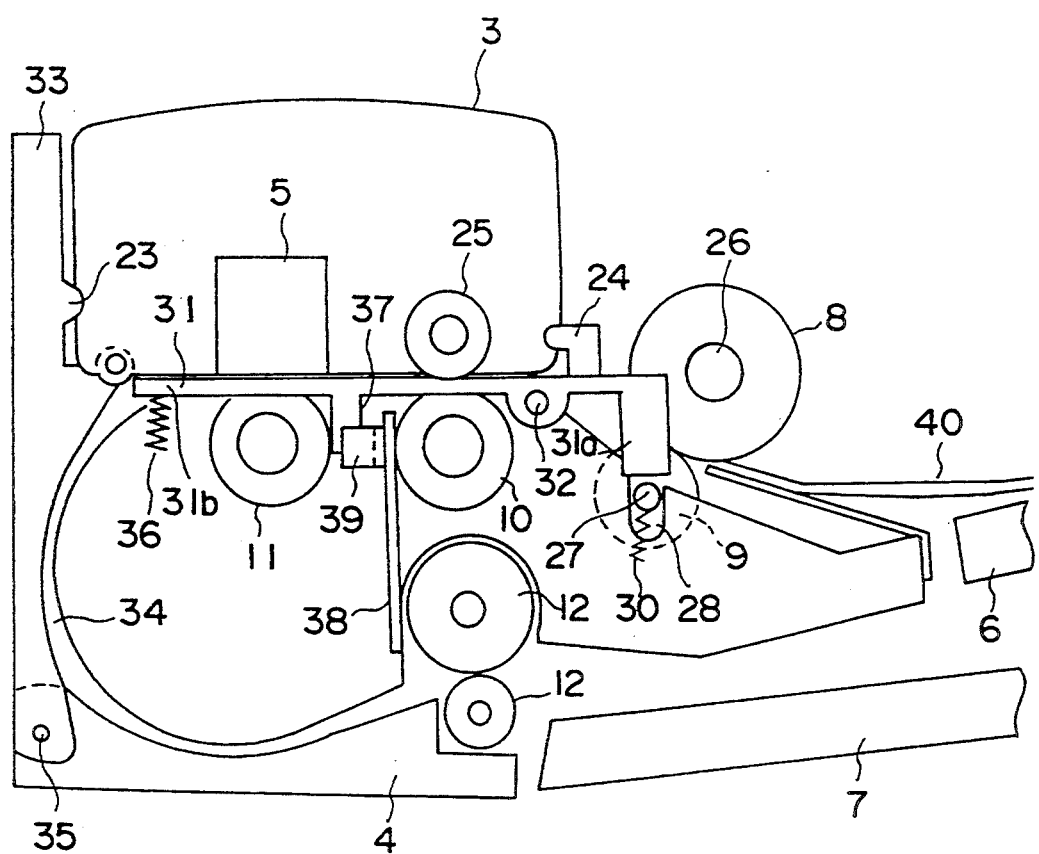
FIG. 4 is a view for explaining in detail the image reading unit.
Figure 5:
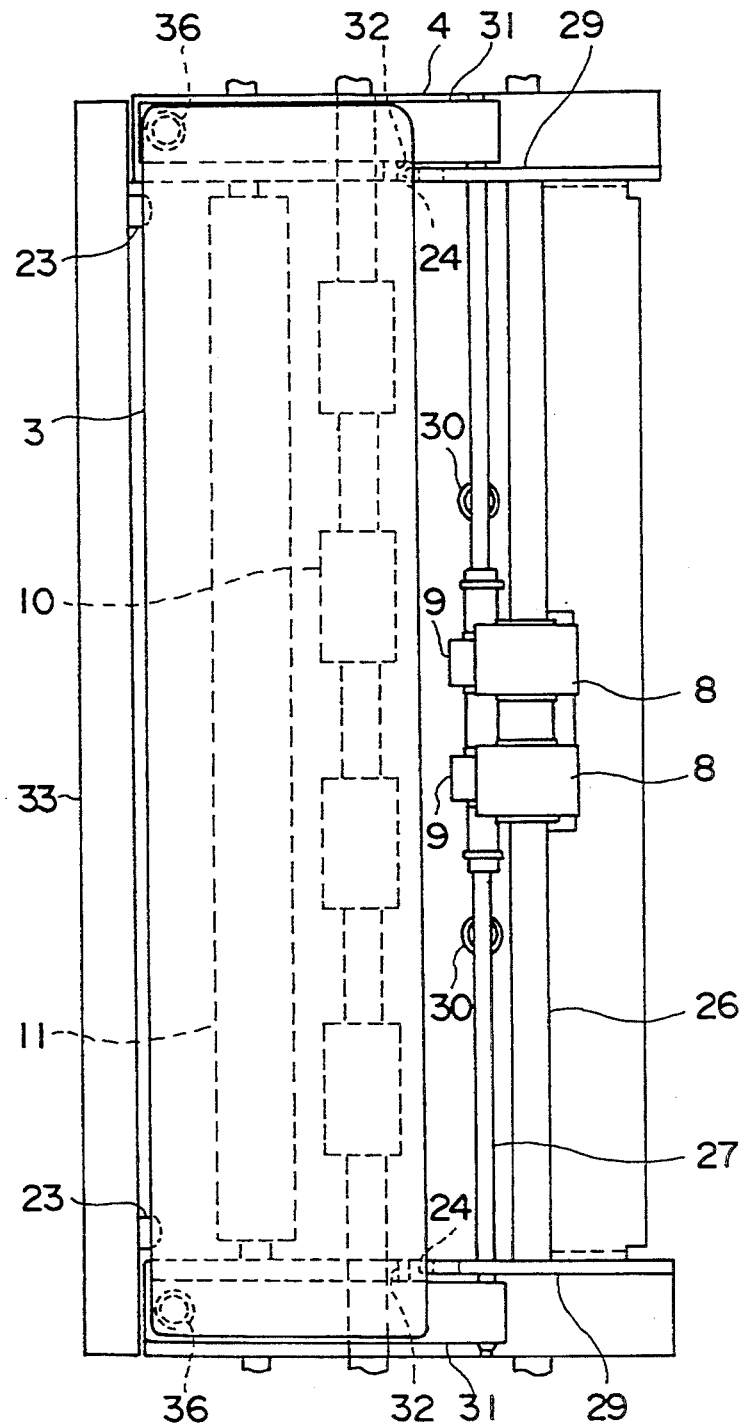
FIG. 5 is a plan view showing in detail the image reading unit.

FIG. 4 is a view for explaining the image reading unit in detail and FIG. 5 is a plan view showing the image reading unit in detail. In the figures, the handy scanner 3 is fixedly positioned to the automatic draft feeder 4 by latches 23 and 24. The handy scanner 3 is provided with a sensor unit for reading images in the draft and a guide roller 25 therein. A paper supply roller 8 for feeding drafts is rotatably fixed to the automatic draft feeder 4 by way of a shaft 26, and a separating roller 9 is rotatably fixed to the automatic draft feeder 4 diagonally from the lower position of the paper supply roller 8 by way of a shaft 27. The shaft 27 is movable along a long groove 28 as illustrated in FIG. 4. The long groove 28 is formed in the frame 29 as illustrated in FIG. 5. An end of a spring 30 engages the shaft 27 to press the separating roller 9 against the paper supply roller 8 by its resilience.

A scanner hopper 31 is fixed in the upper portion of the automatic draft feeder 4 in such a way to be turnable about a supporting shaft 32. The scanner hopper 31 is attached to the automatic draft feeder 4 at the both end portions thereof, and the handy scanner 3 is mounted on the scanner hopper 31 and is fixedly positioned thereto by left and right latches 23 and 24. The latch 23 is formed on a conveying guide 33. The conveying guide 33 forming the outer side of a conveying direction reversing route 34 of the automatic draft feeder 4 extends to the position where the handy scanner 3 is fixed to the automatic draft feeder 4 and is turnable about a fulcrum 35.

The scanner hopper 31 has substantially an L shape as illustrated in FIG. 4, and is positioned close to the upper portion of the shaft 27 of the separating roller 9 at the rear end portion 31a thereof. A spring 36 is provided under the front end portion 31b of the scanner hopper 31 for biasing the front end portion 31b upward. A shading plate 37 is integrally formed with the scanner hopper 31. The automatic draft feeder 4 comprises a printed circuit board 38, on which a photosensor 39 composed of a light-emitting and a light-receiving elements is mounted. Accordingly, the shading plate 37 enters between the light-emitting and light-receiving elements of the photosensor 39 when the handy scanner 3 is attached to the image reading unit 2 as illustrated in FIG. 4 to intercept the light path, whereby the handy scanner 3 is detected as it is mounted on the image reading unit 2.

The reading operation of this embodiment is performed as follows.

Referring to FIG. 4, at first a draft 40 on the paper supply tray 6 is drawn out by the clockwise rotation of the paper supply roller 8 and is separated sheet by sheet by the separating roller 9 pressingly contacting the draft 40. Thereafter, the draft 40 is conveyed as it is clamped by the conveying roller 10 and the guide roller 25, and is further conveyed to the portion under the reading sensor unit 5 by way of the conveying roller 11, where the reading sensor unit 5 reads the image information on the draft 40. After the completion of reading, the draft 40 enters the conveying direction reversing route 34 thereby to be reversed in conveying direction and is discharged on the paper discharge tray 7 by way of the discharge roller 12.

Figure 6:
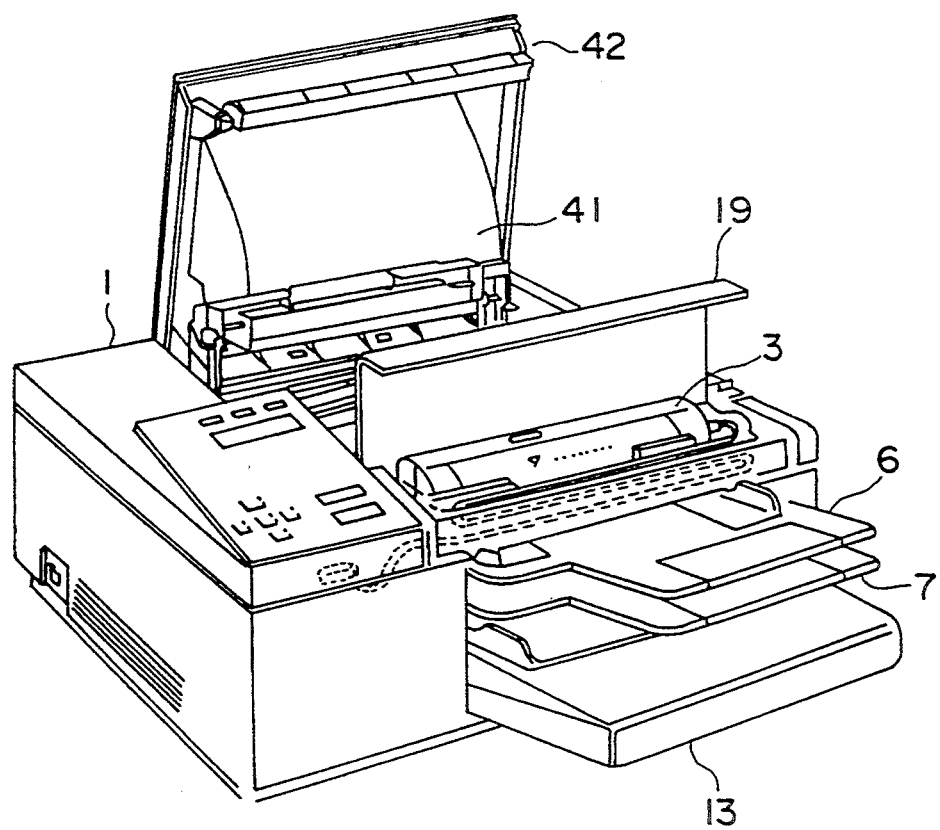
FIG. 6 is a perspective view provided with the image reading unit.
Figure 7:
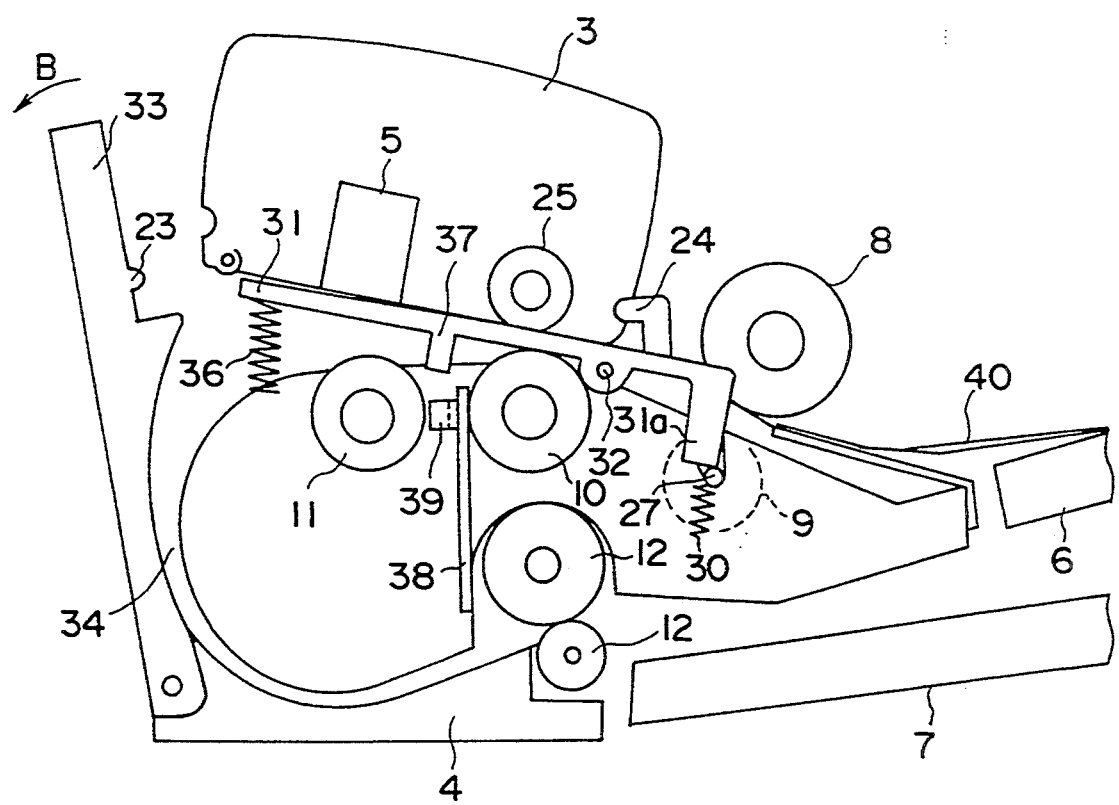
FIG. 7 is a view for explaining in detail the image reading unit.

When the draft 40 is jammed in transit, at first, the upper cover 42 containing the printing unit 42 therein is opened as illustrated in FIG. 6. Thereafter, the conveying guide 33 is turned in the direction of the arrow B as illustrated in FIG. 7, so that the latch 23 comes off the handy scanner 3. Whereby the scanner hopper 31 is turned clockwise about the supporting shaft 32 with the handy scanner 3 mounted thereon as it is pressed upward by the spring 36. The handy scanner 3 is also turned clockwise about the latch 24, so that a gap is formed between the handy scanner 3 and the automatic draft feeder 4 and the conveying rollers 10 and 11 are disengaged from the guide roller 25 and the reading sensor unit 5 respectively. As a result, the draft 40 jammed between the handy scanner 3 and the automatic draft feeder 4 can be easily removed. Furthermore, the draft 40 jammed in the conveying direction reversing route 34 can be also removed with ease by opening the conveying guide 33 in the direction of the arrow B.

Still furthermore, the rear end portion 31a of the scanner hopper 31 contacts the shaft 27 thereby pressing down the same against the pressure of the spring 30 by the clockwise turning of the scanner hopper 31. As a result, the separating roller 9 is separated from the paper supply roller 8 as illustrated in FIG. 7. Accordingly, in case that the draft 40 is jammed between the separating roller 9 and the paper supply roller 8, it can be easily removed.

INDUSTRIAL UTILIZATION

As described above, the present invention is adapted for removing a draft jammed in the image reading unit of a printer provided therewith.

What is claimed is:
1. A printer comprising:
   an image reading unit including,
   an automatic draft feeder having a paper supply roller for feeding a sheet of paper to the image reading unit for scanning an image on the sheet of paper;

a separating member having a first position being pressed against the paper supply roller and having a second position being separated from the paper supply roller;

a hopper pivotable around an axis, the hopper engaging the separating member and moving the separating member to the second position of the separating member when the hopper pivots around the axis to a first position of the hopper;

a biasing device for biasing the hopper towards the first position of the hopper;

an image scanner detachably mounted on the hopper; and a retaining member for retaining the image scanner, the hopper being retained in a second position of the hopper and engaging the separating member so the separating member presses against the paper supply roller when the image scanner is retained by the retaining member, and the hopper pivoting around the axis first position of the hopper when the image scanner is released by the retaining member.

2. A printer comprising:

an image reading unit including, an automatic draft feeder for conveying a sheet of paper to the image reading unit in a first conveyance direction;

a direction reversing device for conveying the sheet of paper in a second conveyance direction, the second conveyance direction being in a direction which is substantially reversed from the first conveyance direction, the direction reversing device being openable for releasing a jammed sheet of paper;

an image scanner detachably mounted on the direction reversing device; and a retaining member for retaining the image scanner on the direction reversing device when the direction reversing device is closed and for releasing the image scanner from the direction reversing device when the direction reversing device is opened.

3. The printer according to claim 2, wherein the direction reversing device includes a conveying guide which is pivotally fixed to the automatic draft feeder, the conveying guiding being pivotable to an open position for releasing the jammed sheet of paper when the direction reversing is opened.

4. A printer comprising:

a paper discharging portion at an upper portion of the printer for receiving a sheet of paper printed by a printing portion of the printer;

an image reading unit including, an image scanner for scanning an image on a sheet of paper, the image scanner being detachably mounted to the image reading unit; and a cover attached to a housing of the printer for covering the image scanner, an upper surface of the cover forming a part of the paper discharging portion.

5. An image reading device comprising:

an image reading unit including, an automatic draft feeder having a paper supply roller for feeding a sheet of paper to the image reading unit for scanning an image on the sheet of paper;

a separating roller pressed against the paper supply roller in a first position of the separating roller and being separated from the paper supply roller in a second position of the separating roller;

an image scanner detachably mounted on the automatic draft feeder, the image scanner performing an image scanning operation; and hopper means, fixed to the automatic draft feeder and being pivotable around an axis, for supporting the image scanner, the hopper means being pivotable to an open position for releasing a jammed sheet of paper from the automatic draft feeder and being pivotable to a closed position when the image scanner performs the image scanning operation, the hopper means separating the separating roller from the paper supply roller and detaching the image scanner from the automatic draft feeder when the hopper means is pivoted to the open position, and allowing the separating roller to contact the paper supply roller when the hopper means is pivoted to the closed position.

* * * * *